3,374,244
N-(DIALKYLAMINOALKYL)ADAMANTANECARBOXAMIDES AND RELATED COMPOUNDS

Carl Peter Krimmel, Wauconda, Ill., assignor to G. D. Searle & Co., Chicago, Ill., a corporation of Delaware
No Drawing. Continuation-in-part of application Ser. No. 466,832, June 24, 1965. This application June 30, 1966, Ser. No. 561,707
Claims priority, application Great Britain, June 13, 1966, 26,187/66
7 Claims. (Cl. 260—326.3)

ABSTRACT OF THE DISCLOSURE

The present N-(dialkylaminoalkyl)adamantanecarboxamides and related compounds possess anti-inflammatory, anti-bacterial, anti-protozoal, anti-fungal, and anti-algal activity. The compounds are prepared by the reaction of adamantane-1-carbonyl chloride or the corresponding homoadamantane compound with a dialkylaminoalkylamine or similar compound.

---

The present application is a continuation-in-part of application Ser. No. 466,832, filed June 24, 1965, and now abandoned.

The present invention relates to a group of amides of adamantanecarboxylic acid and homoadamantanecarboxylic acid. More particularly, it relates to a group of compounds having the following general formula

wherein Ad is selected from the group consisting of adamantyl and homoadamantyl with, in each case, the free valence occuring at a bridgehead position; Alk is alkylene separating the nitrogens attached thereto by at least 2 carbon atoms; —NRR' is selected from the group consisting of di(lower alkyl)amino and cyclic amino. Examples of cyclic amino radicals are 1-pyrrolidinyl, piperidino, hexamethylenimino, morpholino, and 4-methyl-1-piperazinyl.

The lower alkylene radicals referred to above contain up to 7 carbon atoms and can be exemplified by ethylene, propylene, trimethylene, tetramethylene, pentamethylene, and heptamethylene. The lower alkyl radicals referred to above contain up to 6 carbon atoms and can be exemplified by methyl, ethyl, propyl, isopropyl, butyl, and the like.

The organic bases of this invention form pharmaceutically aceptable salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of this invention are conveniently prepared from the reaction of an amine of the formula H₂N—Alk—NRR', wherein Alk and —NRR' are defined as above, with an adamantane or homoadamantane carboxylic acid halide. The acid chloride is preferred for this reaction. The reaction is carried out in an inert solvent such as benzene or a tertiary amine such as pyridine. In some instances, it may be necessary to apply external heat to the mixture in order for more complete reaction to take place.

The compounds of the invention are useful because of their pharmacological properties. In particular, these compounds possess anti-inflammatory activity. Thus, they have a phenylbutazone-like effect on edematous conditions. In addition, they possess antibiotic activity against a variety of organisms. Thus, they inhibt the growth of bacteria such as *Diplococcus pneumoniae*, protozoa such as *Tetrahymena gelleii*, fungi such as *Trichophyton mentagrophytes* and *Candida albicans*, and algae such as *Chlorella vulgaris*. They also inhibit germination of seeds of *Trifolium*.

The following examples are presented to further illustrate the present invention; they should not be construed as limiting it in spirit or in scope. In these examples, quantities by weight are indicated in grams, quantities by volume are indicated in milliliters, and temperatures are indicated in degrees centigrade (° C.).

Example 1

A mixture of 3.0 grams of adamantane-1-carboxylic acid and 20 ml. of thionyl chloride is refluxed for 30 minutes. Unreacted thinoyl chloride is then removed by distilling the mixture under reduced pressure on a steam bath. Azeothropically dried benzene is then added to the residue and distillation is resumed to remove any final traces of thionyl chloride. After removal of the benzene, the residual adamantane-1-carbonyl chloride is dissolved in 20 ml. of dry benzene and 1.7 grams of 3-dimethylaminopropylamine is added portionwise with stirring. The resultant reaction mixture is then allowed to cool for 30 minutes during which time 2 layers form. The lower layer solidifies to a crystalline slurry which is separated by filtration, washed with benzene, and dried. It is then dissolved in 350 ml. of boiling acetone and the solution is treated with decolorizing charcoal, concentrated, and cooled. The solid which separates is then filtered and dried to give N-(3-dimethylaminopropyl)adamantane-1-carboxamide hydrochloride melting at about 157–161° C.

Example 2

To a solution of 5 grams of 3-dimethylaminopropylamine in 20 ml. of pyridine is added, with stirring and cooling, 4.7 grams of adamantane-1-carbonyl chloride over a 10 minute period. The resultant reaction mixture is allowed to stand at room temperature for about 16 hours and is then poured into 200 ml. of water. The aqueous solution is made acidic by the addition of 10% hydrochloric acid and then washed with ethyl acetate. The aqueous layer is made basic by the addition of 20% sodium hydroxide solution and extracted with ether and ethyl acetate. The extract is then washed twice with water and dried over anhydrous sodium sulfate. Removal of the solvent by vacuum distillation affords an oil which solidifies on standing. Recrystallization of the solid from hexane gives N-(3-dimethylaminopropyl)adamantane-1-carboxamide as crystals melting at about 77–78° C. This compound has the following formula

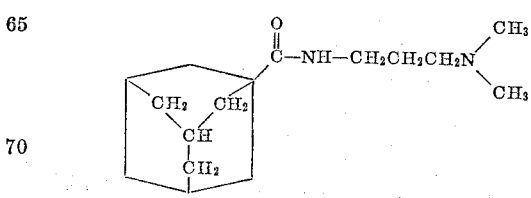

Example 3

Adamantane-1-carbonyl chloride is prepared from 3.0 grams of adamantane-1-carboxylic acid according to the procedure described in Example 1. The acid chloride is then dissolved in 10 ml. of azeotropically dried benzene and, to this solution, there is added with stirring 2.0 grams of 2-diethylaminoethylamine in 10 ml. of dried benzene. The resultant mixture is then cooled and the solid which forms is separated by filtration and dried. It is then dissolved in 500 ml. of refluxing acetone, treated with charcoal, and concentrated. The white crystals which form in the cooled concentrated solution are separated by filtration to give N-(2-diethylaminoethyl)adamantane-1-carboxamide hydrochloride melting at about 190–193° C.

2.0 grams of this amide is dissolved in 30 ml. of water and the solution is made alkaline by the addition of 3.0 grams of sodium hydroxide in 20 ml. of water. The mixture is then extracted with ether and the ether extract is separated and dried. Evaporation of the solvent from ether the solution gives a pale yellow oil which solidifies on cooling to give a friable crystalline mass melting at about 76–80° C. This product is N-(2-diethylaminoethyl)adamantane-1-carboxamide and it has the following formula

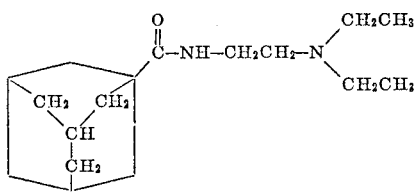

Example 4

To a solution of 1.0 gram of N-(2-diethylaminoethyl)adamantane-1-carboxamide in 10 ml. of 2-butanone is added 1.5 grams of ethyl bromide. The resultant mixture is refluxed on a steam bath for 4 hours and then cooled. The precipitate which forms is separated by filtration, washed with 2-butanone, and dried. The white crystalline product thus obtained is N-(2-diethylaminoethyl)-adamantane-1-carboxamide ethobromide and it melts at about 234–238° C. The corresponding methiodide is prepared in a similar manner.

Example 5

Adamantane-1-carbonyl chloride is prepared from 8.0 grams of adamantane-1-carboxylic acid according to the procedure described in Example 1. The acid chloride is then dissolved in 50 ml. of anhydrous benzene and to this solution is added, with stirring, 3.9 grams of 2-dimethylaminoethylamine in 50 ml. of anhydrous benzene. The white precipitate which forms after standing for a period of 2 hours is separated by filtration and dried. The resultant crude product is then dissolved in 700 ml. of hot 2-butanone, treated with decolorizing charcoal, and filtered hot through diatomaceous earth. Concentration and cooling of the filtrate gives N-(2-dimethylaminoethyl)adamantane-1-carboxamide hydrochloride as white, needle-like crystals melting at about 206–209° C.

Example 6

Homoadamantane-3-carbonyl chloride is prepared from 3.0 grams of homoadamantane-3-carboxylic acid according to the procedure described in Example 1 for the preparation of adamantane-1-carbonyl chloride. The acid chloride is then dissolved in 10 ml. of anhydrous pyridine and, to this solution, there is added 1.9 grams of 2-diethylaminoethylamine in 10 ml. of anhydrous pyridine. The resultant mixture is heated on a steam bath for about one hour and then cooled. The solid which forms is separated by filtration, washed with 10 ml. of anhydrous benzene, and dried. It is then dissolved in refluxing 2-butanone, treated with decolorizing charcoal, and filtered through diatomaceous earth. The resultant filtrate is cooled to give N-(2-diethylaminoethyl)homoadamantane-3-carboxamide hydrochloride, melting at about 195–198° C. The free base of this compound has the following formula

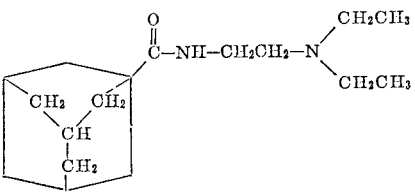

Example 7

A solution is prepared from 6.0 grams of adamantane-1-carbonyl chloride and 50 ml. of azeotropically dried benzene and a solution of 4.9 grams of N,N-diethyl-1,5-pentanediamine in 50 ml. of azeotropically dried benzene is added with stirring. The resultant mixture is refluxed for 1 hour and then concentrated to about one half the original volume. The residual solution is then cooled in an ice bath and the precipitate which forms is removed by filtration. The resultant filtrate is then concentrated to give N-(5-diethylaminopentyl)adamantane-1-carboxamide hydrochloride as white crystals melting at about 144–149° C.

Example 8

Adamantane-1-carbonyl chloride is prepared from 8.0 grams of adamantane-1-carboxylic acid according to the procedure described in Example 1. The acid chloride is then dissolved in 50 ml. of anhydrous benzene and to this solution there is added, with stirring, 8.5 grams of N,N-diethyl-1,7-heptanediamine in 50 ml. of anhydrous benzene. The resultant mixture gives, upon cooling, standing at room temperature and scratching, a white granular crystalline precipitate which is separated by filtration and dried. This crude product is dissolved in 700 ml. of hot 2-butanone, treated with charcoal, and then filtered through diatomaceous earth. The resultant filtrate is concentrated and cooled and then allowed to stand at room temperature for about 6 hours. This gives N-(7-diethylaminoheptyl)adamantane-1-carboxamide hydrochloride, melting at about 130–141° C.

The necessary diamine starting material is obtained by the following procedure. 220 grams of hexamethylene chlorohydrin is reacted with 221 grams of phosphorus tribromide according to the procedure described by Cloke et al., J. Am. Chem. Soc. 53, 2791 (1931), to give hexamethylene chlorobromide boiling at about 92–94° C. at 9.0 mm. pressure. 286 grams of the chlorobromide is reacted with 112 grams of potassium cyanide according to the procedure described in A. H. Blatt "Organic Syntheses," coll. vol. I, John Wiley & Sons, Inc., New York, N.Y., 1941, page 156 to give 7-chloroheptanonitrile boiling at about 121–124° C. at 8.0 mm. pressure.

A mixture of 110 grams of the above chloronitrile, 150 grams of diethylamine and 2 grams of potassium iodide in 150 ml. of 2-butanone is placed in 2 pressure bottles and heated in a steam cabinet for 90 hours. The resultant mixtures are cooled and filtered and the solvent is evaporated from the combined filtrate. The residue is made acid with dilute hydrochloric acid and washed once with ether, and the acid solution is then made alkaline with 40% sodium hydroxide solution. The alkaline solution is then saturated with solid potassium carbonate and an oil is salted out. The resultant mixture is extracted with ether and the ether extract is dried over sodium sulfate and the solvent is evaporated. The residue is then distilled to give 7-diethylaminoheptanonitrile boiling at about 128–131° C. at 7.0 mm. pressure. A solution of 102 grams of the 7-diethylaminoheptanonitrile and 44 grams of ammonia in 500 ml. of methanol is hydrogenated over Raney nickel at a pressure of about 680 pounds and a temperature of about 49° C. The mixture is then cooled and filtered and the residue is distilled to give N,N-diethyl-1,7-heptanediamine boiling at about 109–110.5° C. at 6 mm. pressure.

Example 9

Adamantane-1-carbonyl chloride is prepared from 8.0 grams of adamantane-1-carboxylic acid according to the procedure described in Example 1. The acid chloride is dissolved in 50 ml. of anhydrous benzene and, to this solution, there is added with stirring 5.8 grams of 1-(2-aminoethyl)piperidine in 50 ml. of anhydrous benzene. The resultant brown solution is then cooled and the solid which forms is separated by filtration and dried. It is dissolved in 700 ml. of refluxing 2-butanone, treated with decolorizing carbon, and filtered hot through diatomaceous earth. The filtrate is cooled to give N-(2-piperidinoethyl)adamantane-1-carboxamide hydrochloride, melting at about 198–201° C.

Example 10

To 7.3 grams of adamantane-1-carbonyl chloride in 175 ml. of anhydrous benzene is added 5.2 grams of 1-(3-aminopropyl)piperidine. The resulting solution is refluxed, with stirring, for a period of about one hour, after which time it is allowed to stand at room temperature for about 64 hours. The solution is then stirred and cooled in ice. The precipitate which forms is collected by filtration, washed with ether and dried in vacuo. A portion of the resulting crude product is recrystallized from acetone to yield N-(3-piperidinopropyl)adamantane-1-carboxamide hydrochloride, melting at about 171–174° C.

The remaining portion of the crude product is dissolved in water and treated with a 5% sodium carbonate solution. The oil which forms gradually solidifies, and is collected by filtration and dried to yield N-(3-piperidinopropyl)adamantane-1-carboxamide.

Example 11

Adamantane-1-carbonyl chloride is prepared from 3.0 grams of adamantane-1-carboxylic acid according to the procedure described in Example 1. The acid chloride is then dissolved in 20 ml. of anhydrous benzene and the resultant solution is added, at one time and with stirring, to a solution of 2.2 grams of 1-(3-aminopropyl)pyrrolidine in 20 ml. of anhydrous benzene. The resultant reaction mixture is refluxed for 30 minutes before it is cooled and extracted with 200 ml. of water. The aqueous extract is filtered through decolorizing charcoal and the resultant filtrate is made alkaline by the addition of 10% sodium hydroxide solution. An oil separates and the resultant mixture is extracted with ether. The ether extract is treated with decolorizing carbon and dried over anhydrous calcium sulfate. The ether solvent is then removed and the residue is seeded with a crystal of the diethylaminoethyl compound of Example 3. The product thus obtained as a pale yellow powder is N-[3-(1-pyrrolidinyl)propyl]adamantane-1-carboxamide and it melts at about 65–69° C.

Similarly, adamantane-1-carbonyl chloride is reacted with 4-(2-aminoethyl)morpholine and with 1-(2-aminoethyl)hexamethyleneimine according to the procedure detailed above to give, respectively, N-(2-morpholinoethyl) adamantane-1-carboxamide and N - (2-hexamethyleneiminoethyl)adamantane-1-carboxamide.

Example 12

To a solution of 5 grams of adamantane-1-carbonyl chloride in 125 ml. of benzene is added 3 grams of 1-(2-aminoethyl)pyrrolidine. The reaction mixture is heated at reflux for about one-half hour, and then allowed to stand at room temperature for about 16 hours. The precipitate which forms is separated by filtration and recrystallized from a solution containing acetone combined with methanol and water to give N-[2-(1-pyrrolidinyl) ethyl]adamantane-1-carboxamide hydrochloride, melting at about 225–226° C.

Example 13

To a solution of 4 grams of 1-(3-aminopropyl)-4-methylpiperazine in 20 ml. of pyridine is added, with stirring and cooling, 5 grams of adamantane-1-carbonyl chloride over a period of 10 minutes. The resultant reaction mixture is allowed to stand at room temperature for about 40 hours and then is poured into 130 ml. of water. The solid which forms is separated by filtration and identified as adamantane-1-carboxylic acid. The filtrate is made acidic by the addition of 10% hydrochloric acid. The non-aqueous layer is extracted with ethyl acetate and discarded. The remaining aqueous layer is made basic by the addition of sodium carbonate and then extracted with ethyl acetate, washed three times with water and dried over anhydrous sodium sulfate. Removal of the solvent by distillation gives an oil which solidifies to yield N-[3-(4-methyl-1-piperazinyl)propyl]adamantane-1-carboxamide.

0.8 gram of the above product is dissolved in ether and treated with isopropanolic hydrogen chloride. The product obtained is collected by filtration and recrystallized from ethanol-acetone to give the dihydro-chloride salt of the product of the preceding paragraph. This salt decomposes at about 210° C. The free base has the following formula

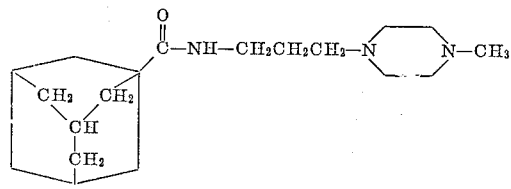

What is claimed is:

1. A member selected from the group consisting of compounds of the formula

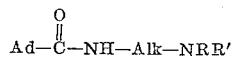

wherein Ad is selected from the group consisting of adamantyl and homoadamantyl; Alk is alkylene having from 2 to 7 carbon atoms and separating the nitrogens attached thereto by at least 2 carbon atoms; and —NRR′ is selected from the group consisting of di(lower alkyl) amino, 1-pyrrolidinyl, piperidino, hexamethylenimino, morpholino, and 4-methyl-1-piperazinyl; and the acid addition and alkyl halide quaternary ammonium salts thereof.

2. A compound according to claim 1 which has the formula

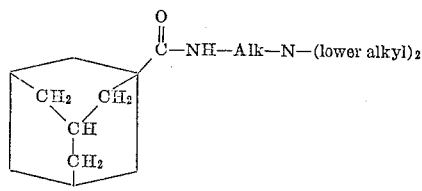

wherein Alk is alkylene having from 2 to 7 carbon atoms and separating the nitrogens attached thereto by at least 2 carbon atoms.

3. A compound according to claim 1 which has the formula

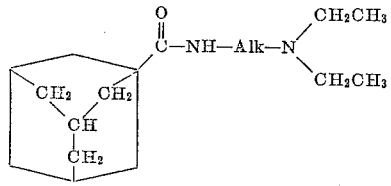

wherein Alk is alkylene having from 2 to 7 carbon atoms and separating the nitrogens attached thereto by at least 2 carbon atoms.

4. A compound according to claim 1 which is N-(2-diethylaminoethyl)adamantane-1-carboxamide.

5. A compound according to claim 1 which is N-(3-dimethylaminopropyl)adamantane-1-carboxamide.

6. A compound according to claim 1 which is N-[3-(1-pyrrolidinyl)propyl]adamantane-1-carboxamide.

7. A compound according to claim 1 which is N-(2-diethylaminoethyl)homoadamantane-3-carboxamide.

References Cited

FOREIGN PATENTS 1,353,906   8/1964   France.

ALEX, MAZEL, *Primary Examiner.*

J. TOVAR, *Assistant Examiner.*

UNITED STATES PATENT OFFICE
CERTIFICATE OF CORRECTION

Patent No. 3,374,244　　　　　　　　　　　　　　March 19, 1968

Carl Peter Krimmel

It is certified that error appears in the above identified patent and that said Letters Patent are hereby corrected as shown below:

Column 3, line 20, "ether the" should read -- the ether --.
Column 4, the formula should appear as shown below:

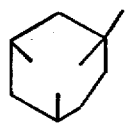

Signed and sealed this 2nd day of December 1969.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents